United States Patent
Gonnocci

(10) Patent No.: US 6,206,382 B1
(45) Date of Patent: *Mar. 27, 2001

(54) EQUALIZING POWER CHUCK

(76) Inventor: Ralph J. Gonnocci, 1130 Cobridge Dr., Rochester Hills, MI (US) 48306

( * ) Notice: Subject to any disclaimer, the term of this patent is extended or adjusted under 35 U.S.C. 154(b) by 0 days.

This patent is subject to a terminal disclaimer.

(21) Appl. No.: 09/491,028

(22) Filed: Jan. 25, 2000

(51) Int. Cl.$^7$ ........................................ B23B 31/02
(52) U.S. Cl. ................................. 279/132; 279/137
(58) Field of Search ................................. 279/132, 137

(56) References Cited

U.S. PATENT DOCUMENTS

| | | |
|---|---|---|
| 2,613,943 | 10/1952 | Trudeau . |
| 2,722,427 | 11/1955 | Labeyrie . |
| 3,069,181 | 12/1962 | Hohwart et al. . |
| 3,131,948 | 5/1964 | Buck . |
| 3,233,908 | 2/1966 | Schwartzmayr et al. . |
| 3,267,580 | 8/1966 | Hohwart et al. . |
| 3,365,206 | 1/1968 | Hohwart et al. . |
| 3,423,098 | 1/1969 | Hohwart et al. . |
| 3,472,526 | 10/1969 | Hohwart . |
| 3,604,717 | 9/1971 | Hohwart . |
| 3,945,652 | 3/1976 | Hohwart et al. . |
| 4,215,605 | 8/1980 | Toth et al. . |
| 4,465,289 | 8/1984 | Banks . |
| 4,497,499 | 2/1985 | Allen . |
| 4,569,530 | 2/1986 | Cross . |
| 4,679,802 | 7/1987 | Beal . |
| 5,184,833 | 2/1993 | Cross et al. . |
| 5,322,305 | 6/1994 | Cross et al. . |
| 5,409,242 | 4/1995 | Gonnocci . |
| 5,941,538 | * 8/1999 | Gonnocci .............................. 279/132 |

FOREIGN PATENT DOCUMENTS 236623   7/1945   (CH) .

* cited by examiner

Primary Examiner—A. L. Wellington
Assistant Examiner—Monica S. Carter
(74) Attorney, Agent, or Firm—Bliss McGlynn, P.C.

(57) ABSTRACT

An equalizing power chuck includes a body, a plurality of work engaging jaws, and a plurality of rocker arms carrying the jaws. The rocker arms extend axially along an axis and have a mounting portion at one axial end for the jaws and an end portion at the other axial end. The equalizing power chuck also includes a plurality of swivel mountings connecting the rocker arms to the body, a plurality of slide members receiving the end portions of the rocker arms, a reciprocal actuator disposed centrally of the rocker arms, and a plurality of carrier members pivotally secured to the actuator. Each of the carrier members operatively cooperates with a pair of the slide members such that reciprocatory movement of the actuator moves the carrier members and correspondingly the slide members to move pairs of the jaws simultaneously relative to each other to engage a work-piece therebetween and allows the pairs of the jaws to pivot until a pressure exerted on the work-piece by the work engaging jaws is equalized.

20 Claims, 2 Drawing Sheets

EQUALIZING POWER CHUCK

BACKGROUND OF THE INVENTION

1. Field of the Invention

The present invention relates generally to chucks and, more particularly, to an equalizing power chuck.

2. Description of the Related Art

Generally, power chucks are used to hold a work-piece. Typically, these power chucks are mounted on a rotatable spindle of a machine tool. Commonly, the power chuck has a body and an axially disposed actuator mounted for reciprocation therein. The power chuck also has a plurality of axially extending rocker arms with work engaging jaws spaced radially equidistantly around the actuator and mounted for rocking movement to engage and disengage the work-piece.

An improved power chuck was disclosed in U.S. Pat. No. 5,184,833, issued Feb. 9, 1993, to Kenneth Cross and Ralph J. Gonnocci and U.S. Pat. No. 5,409,242, issued Apr. 25, 1995, to Ralph J. Gonnocci. The disclosed power chucks include a body, a plurality of work engaging jaws and a plurality of swivel mountings connecting the rocker arms to the body. However, these power chucks only had three rocker arms and work engaging jaws to engage the work-piece, which move simultaneously to engage the work-piece. If the work-piece is out-of-round, one or two of the jaws may apply more clamping pressure than the remaining jaw and, thus, lacks sensitivity in clamping of a work-piece in the chuck.

Another type of chuck known as an equalizing chuck has been provided with six rocker arms and work engaging jaws to engage the work piece. Such an equalizing chuck is disclosed in U.S. Pat. No. 5,941,538, issued Aug. 24, 1999, to Ralph J. Gonnocci. The disclosed equalizing chuck includes a body, six work engaging jaws, six rocker arms, a reciprocal actuator and six wedge-shaped segments slidably secured to the actuator to move the jaws relative to each other and exert an equalized pressure on the work-piece. However, it is desired to reduce the number of parts and grip the work-piece with pairs of jaws simultaneously with more power.

SUMMARY OF THE INVENTION

It is, therefore, one object of the present invention to provide an equalizing power chuck with increased sensitivity during clamping of a work-piece in the chuck.

It is also an object of the present invention to provide a power chuck with pairs of work engaging jaws that equalize pressure when engaging a work-piece simultaneously.

To achieve the foregoing objects, the present invention is an equalizing power chuck including a body, a plurality of work engaging jaws, and a plurality of rocker arms carrying the jaws. The rocker arms extend axially along an axis and have a mounting portion at one axial end for the jaws and an end portion at the other axial end. The equalizing power chuck also includes a plurality of swivel mountings connecting the rocker arms to the body, a plurality of slide members receiving the end portions of the rocker arms, a reciprocal actuator disposed centrally of the rocker arms, and a plurality of carrier members secured to the actuator. Each of the carrier members operatively cooperate with a pair of the slide members such that reciprocatory movement of the actuator moves the carrier members and correspondingly the slide members to move pairs of the jaws simultaneously relative to each other to engage a work-piece therebetween and allows the pairs of the jaws to pivot until a pressure exerted on the work-piece by the jaws is equalized.

One advantage of the present invention is that an equalizing power chuck is provided with a plurality of work engaging jaws such that pairs of work engaging jaws are moved simultaneously to engage a work-piece. Another advantage of the present invention is that the equalizing power chuck has a carrier member for each pair of work engaging jaws to allow the pressure applied to the work-piece to be equalized for increased sensitivity during clamping of a work-piece.

Other objects, features and advantages of the present invention will be readily appreciated, as the same becomes better understood, after reading the subsequent description taken in conjunction with the accompanying drawings.

DESCRIPTION OF THE PREFERRED EMBODIMENT(S)

Figure 1:
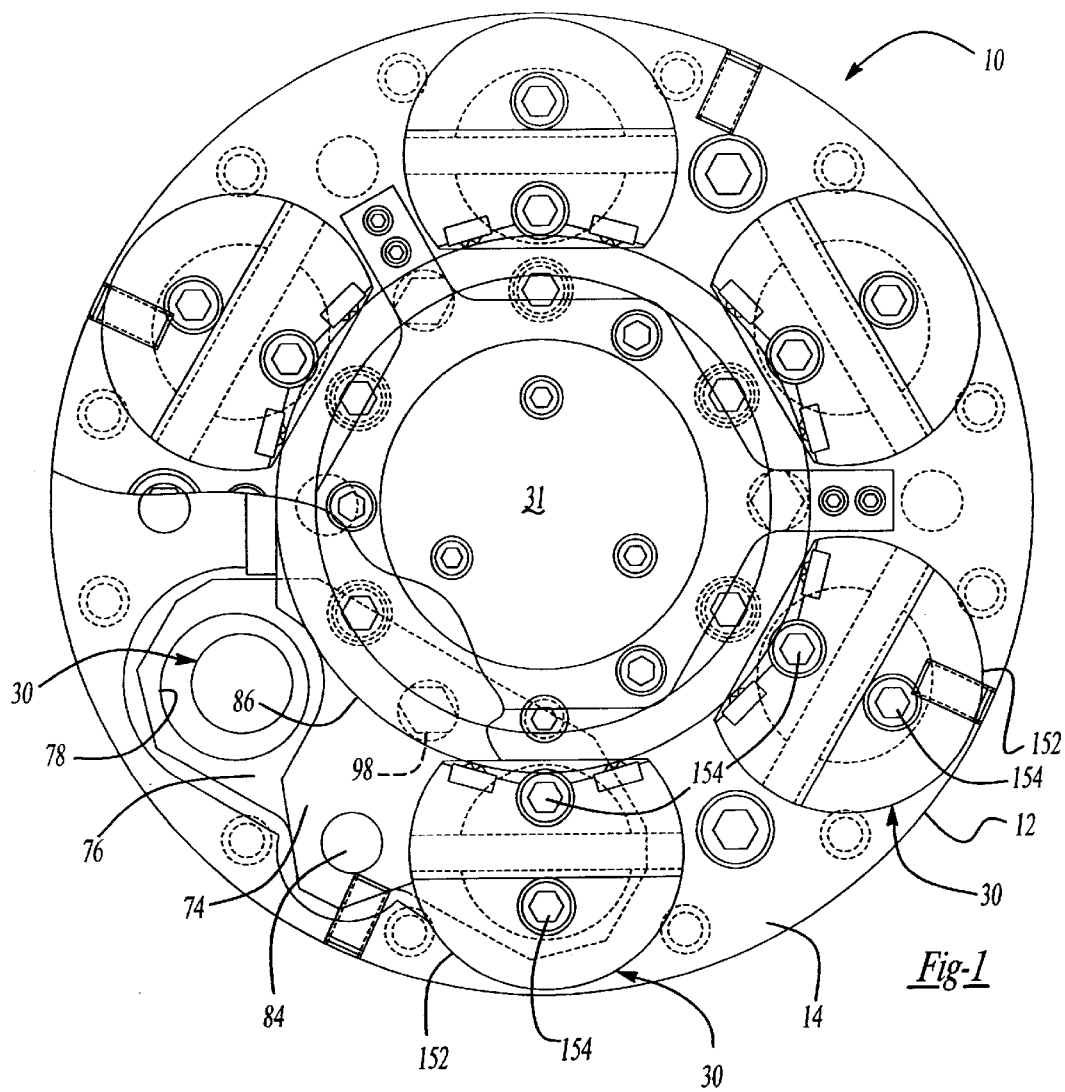
FIG. 1 is a fragmentary plan view of an equalizing power chuck, according to the present invention.
Figure 3:
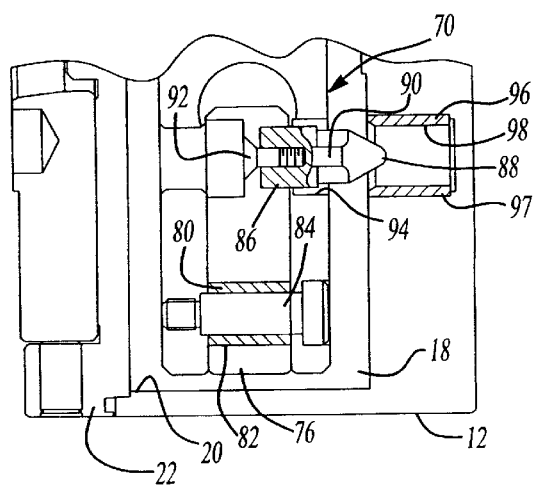
FIG. 3 is an enlarged view of a portion of the equalizing power chuck of FIG. 2.
Figure 2:
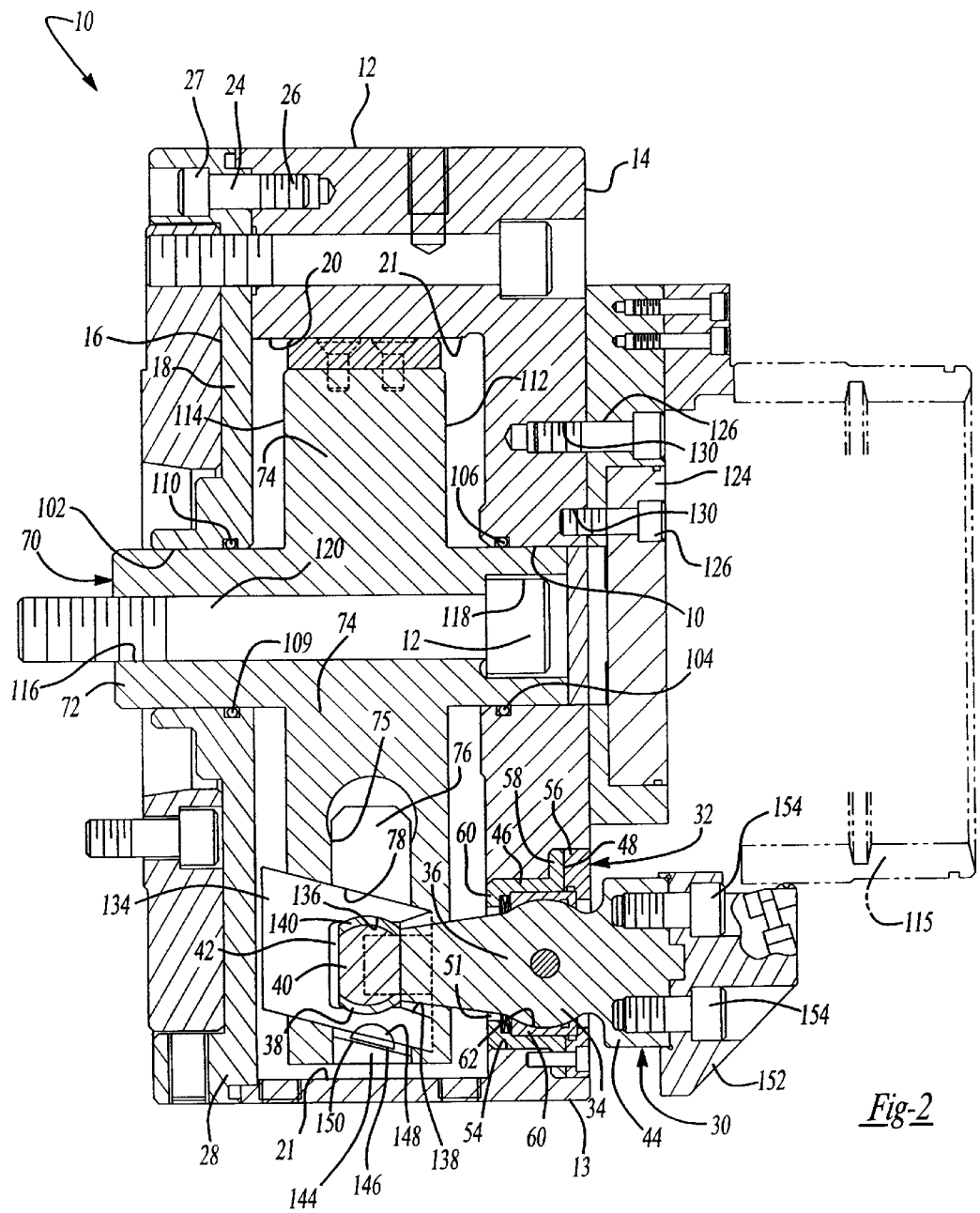
FIG. 2 is a sectional view of the equalizing power chuck of FIG. 1.

Referring to FIGS. 1 through 3, an equalizing power chuck 10, according to the present invention, is shown. The power chuck 10 includes a body 12 that is generally cylindrical in shape. The body 12 is made, preferably, of a metal material. The body 12 has an outer circular peripheral surface 13, radial front face 14, radial rear face 16 and cavity 18 in the interior of the body 12 which is cored out or recessed to accommodate other parts of the power chuck 10. As illustrated in FIG. 2, the cavity 18 has an opening 20 through the rear face 16 and an inner circumferential surface 21.

The equalizing power chuck 10 also includes an adapter plate 22, which is partially recessed into the body 12 and closes the opening 20. The adapter plate 22 is generally cylindrical in shape and has a plurality of apertures 24 extending axially therethrough and adapted to match corresponding internally threaded apertures 26 in the body 12. Fasteners 27 such as screws extend through the apertures 24 and threadably engage the threaded apertures 26 to hold the adapter plate 22 fixedly but detachably fastened to the body 12. It should be appreciated that the adapter plate 22 may be adapted for mounting on the front of a machine spindle (not shown). It should also be appreciated that the adapter plate 22 may be of any suitable shape or design to fit any particular machine or spindle and may vary from one machine to another.

The equalizing power chuck 10 includes a plurality of rocker arms, generally indicated at 30. In the preferred embodiment, six (6) rocker arms 30 are spaced equidistantly with respect to each other and from a central axis 31 of the equalizing chuck 10. The rocker arms 30 extend axially through the front face 14 of the body 12 and into the cavity 18. Each rocker arm 30 is attached to the body 12 by a swivel mounting, generally indicated at 32, to be described.

The rocker arm 30 has a ball portion 34 that is generally spherically shaped and a tapered portion 36 which tapers longitudinally to an end portion 38. The end portion 38 is generally spherically shaped with a pair of opposed flat or planar outer surfaces 40 and a flat or planar bottom surface 42. The rocker arm 30 also has a mounting portion 44 to be described extending longitudinally from the ball portion 34 forwardly of the front face 14 of the body 12.

The swivel mounting 32 includes a tubular mounting member 46 having a radial front flange 48 and a radial rear flange 50. The rear flange 50 terminates to form an opening 51 through which the rocker arm 30 extends and has a rearend portion 52. The mounting member 46 is disposed in a cavity 54 of the body 12. The cavity 54 has an enlarged opening 56 in the front face 14. A front flange 48 of the tubular mounting member 46 is adapted to abut a shoulder 58 forming the enlarged opening 56. It should be appreciated that the rocker arm 30 extends through the enlarged opening 56 and cavity 54.

The swivel mounting 32 also includes a tubular bearing member 60 disposed within the mounting member 46. The bearing member 60 has an arcuate interior surface 62 to matingly engage or contact the outer surface of the ball portion 34. The bearing member 60 is, preferably, a single fracture split member disposed about the ball portion 34 of the rocker arm 30. It should be appreciated that the outer surface of the ball portion 34 pivots on the interior surface 62 of the bearing member 60. It should also be appreciated that the swivel mountings 32 may be similar to that disclosed in U.S. Pat. Nos. 5,409,242 and 5,941,538, the disclosures of both being hereby incorporated by reference.

The equalizing power chuck 10 includes an actuator, generally indicated at 70, to pivot or rock the rocker arms 30. The actuator 70 has a journal 72 and a plurality of arm or lobe portions 74 extending radially from the journal 72. Preferably, three lobe portions 74 are equally circumferentially spaced about the journal 72. Each lobe portion 74 includes a slot 75 receiving a carrier member 76 to be described. Each of the carrier members 76 has a plurality of, preferably a pair of radially outwardly extending inclined apertures 78 for a function to be described.

As illustrated in FIGS. 2 and 3, the carrier members 76 are generally rectangular in shape. The inclined apertures 78 are spaced laterally and extend axially therethrough. The carrier members 76 have a first aperture 80 disposed between the inclined apertures 78 and extending axially therethrough. A bushing 82 is disposed in the first aperture 80 and is generally tubular in shape. A fastener 84 extends through one portion of the lobe portion 74 and bushing 82 and engages an opposed portion of the lobe portion 74 to pivotally secure the carrier member 76 to the lobe portion 74. The carrier member 76 includes a centering pin 86 extending axially for a function to be described. The centering pin 86 has a centering portion 88 having a generally cone shape. The centering pin 86 also has opposed rib portions 90 extending radially outwardly. The carrier member 76 also includes a fastener 92 such as a screw to secure the centering pin 86 to the carrier member 76. It should be appreciated that the centering pin 86 extends through an aperture 94 of the lobe portion 74.

The equalizing power chuck 10 includes a cavity 96 in the body 12 opposite the centering pin 86. The equalizing power chuck 10 also includes a bushing 97 disposed in the cavity 96 and having an aperture 98 extending axially therethrough to receive the centering pin 86. As set forth more fully below, during operation of the equalizing power chuck 10, the centering pin 86 is disposed in the bushing 97 to center the carrier member 76 and a pair of work engaging jaws 152 to be described. It should be appreciated that when the centering pin 86 is retracted from the bushing 97, the carrier member 76 and the work engaging jaws 152 may pivot about the fastener 84.

The journal 72 is disposed and slidably received in apertures 100 and 102 provided centrally in the front face 14 and the rear face 16 of the body 12. A seal 104 such as an O-ring is disposed in a groove 106 about the opening 100 in the front face 14 and a seal 109 such as an O-ring is disposed in a groove 110 about the opening 102 in the rear face 16 to directly contact the journal 72. The actuator 70 is guided for reciprocatory travel in both directions by the apertures 100 and 102 and is limited by front and rear faces 112 and 114 on the lobe portions 74. It will be appreciated that the front face 112 seats against the bottom of the aperture 100 when the actuator 70 is at the forward limit of its travel and that the rear face 114 seats against the top of the rear opening 102 in the rear face 16 when the actuator 70 is at the rearward limit of its travel. It should be appreciated that the rear face 114 may not seat against the rear face 16 when a work-piece 115 is disposed in the equalizing power chuck 10.

The actuator 70 includes an aperture 116 extending axially through the journal 72 and having a countersink 118 at the forward end thereof to accept a machine screw 120 having a head 122 disposed in the countersink 118. It should be appreciated that the machine screw 120 connects the actuator 70 to a drawbar (not shown) disposed within the spindle. It should also be appreciated that suitable breather vents (not shown) are provided to prevent build up of pressure forward of the journal 72.

The equalizing power chuck 10 further includes a cap 124 mounted centrally about the opening 100 in the front face 14 of the body 12. The cap 124 is fixedly but detachably fastened to the body 12 by fasteners 126 such as screws. The fasteners 126 extend through apertures in the cap 124 and threadably engage corresponding internally threaded apertures 130 in the body 12 such that the cap 124 covers the aperture 100 and protects the journal 72. The cap 124 may be formed with an internal pocket or recess that coincides with the aperture 100 and progressively receives the journal 72 as the actuator 70 moves forwardly to the forward limit of its travel. The journal 72 extends entirely through the adapter plate 22 and into the spindle for convenient attachment to the drawbar. Although the actuator 70 is intended for attachment to a mechanical drive such as the drawbar of a machine tool, it can easily be adapted for hydraulic or pneumatic operation.

The equalizing power chuck 10 also includes a power cylinder or slide member 134 connected to each of the rocker arms 30. The slide member 134 is generally cylindrical in shape. The slide member 134 is inclined and adapted to mate with the inclined aperture 78 of the segments 76. The slide member 134 has a cavity 136 with an enlarged tapered opening 138 at a front end thereof. The cavity 136 has an arcuate interior surface 140 having a planar or flat side surfaces (not shown). The end portion 38 is inserted into the cavity 136 of the slide member 134 and rotated such that the arcuate outer surface of the end portion 38 matingly engages or contacts the interior surface 140 of the cavity 136. The slide member 134 also has a groove or keyway 144 circumferentially about the outer periphery thereof which is generally arcuate in shape. A key 146 has an arcuate portion 148 disposed in the keyway 144 and extending partially circumferentially therealong. The key 146 also has a planar portion 150, which abuts the surface of the opening 78. The key 146 prevents the slide member 134 from rotating and disengaging the end portion 38 of the rocker arm 30. It should be appreciated that the end portion 38 rotates along the interior surface 140 of the slide member 134.

The equalizing power chuck 10 further includes a work engaging jaw 152 for each rocker arm 30. The jaw 152 may be cylindrical or rectangular in shape. The jaw 152 is mounted on the mounting portion 44 of the rocker arm 30 by suitable means such as fasteners 154. The specific structure of the mounting mechanism for securing the jaw 152 to the mounting portion 44 is not further described in detail since any one of the numerous well known designs could be used with the present invention.

In operation of the equalizing power chuck 10, the actuator 70 moves between first and second operable positions. In the first position, the actuator 70 is located or placed at the top of the cavity 18 nearest the cap 124. In this position, the end portion 38 of the rocker arm 30 is drawn radially inward and correspondingly the jaws 152 are urged radially outward. Thus, the jaws 152 are placed in an open or unlocked position. The centering pins 86 are disposed in the apertures 98 of the bushings 97 to center the carrier members 76 and pairs of work engaging jaws 152. Once the work-piece 115 is loaded in the jaws 152, the actuator 70 is drawn downward toward the rear face 16. As the actuator 70 is drawn downward, the outwardly extending inclined apertures 78 on the segments 76 cooperate with the slide member 134 to drive the slide member 134 radially outward. Also, the centering pins 86 are withdrawn from the apertures 98 of the bushings 97. Radially outward movement of the slide member 134 pivots or rotates the end of the rocker arm 30 which in turn pivots the rocker arm 30 such that the mounting portion 44 and corresponding jaw 152 are urged radially inward to clamp the work-piece.

As set forth above, the carrier members 76 are pivotal relative to the lobes 74 of the actuator 70 to provide a mechanism to equalize the force applied by the clamping jaws 152. During clamping, it is desirable to have each set or pair of jaws 152 applied roughly the same clamping force. The present invention provides such a mechanism. Once the rib portions 90 of the centering pins 86 are withdrawn out of the apertures 98, the carrier members 76 are allowed to pivot about the fasteners 86, in turn, allowing the rocker arms 30 and work engaging jaws 152 to pivot to equalize pressure or force applied to the work-piece 115 during clamping. Using a cylindrical work-piece as an example, if the work-piece 115 is out of round, one pair of jaws 152 will engage the work-piece first. If the distance of travel for each of the respective pairs of jaws 152 were fixed, the pair initially contacting the work-piece would apply the most pressure and subsequent pairs of jaws 152 may not even contact the work-piece. Additionally, should the work-piece be relatively thin walled, it would be possible for such increased pressure to crush the work-piece. Thus, the present invention provides the carrier members 76 pivotally attached to the lobes 74 of the actuator 70.

In operation, if one pair of clamping jaws 152 contacts the work-piece, the actuator 70 continues to travel downward, in a direction shown by the arrow, its full stroke while the carrier member 76 pivots on the lobe 74. In order to equalize the jaws 152, the carrier member 76 may pivot after one jaw 152 has contacted the work-piece 115 with sufficient pressure to cause the other jaw 152 to contact the work-piece 115 and equalize the pressure applied by that pair of jaws 152 to the work-piece 115. It should be appreciated that each carrier member 76 may rotate to equalize the pressure applied by the pair of jaws 152 operatively connected thereto. Once the relative pressure from each of the pairs of jaws 152 equalizes, the actuator 70 may finish its travel to provide equal clamping pressure on the work-piece 115. It should be appreciated that such an apparatus provides a clamping chuck that positively supports the members of the chuck while allowing for equalization of the clamping forces exerted by the chuck.

The present invention has been described in an illustrative manner. It is to be understood that the terminology, which has been used, is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. An equalizing power chuck comprising:
   a body;
   a plurality of work engaging jaws;
   a plurality of rocker arms carrying said jaws, said rocker arms extending axially along an axis, said rocker arms having a mounting portion at one axial end for said jaws and an end portion at the other axial end;
   a plurality of swivel mountings connecting said rocker arms to said body;
   a plurality of slide members receiving said end portions of said rocker arms;
   a reciprocal actuator disposed centrally of said rocker arms; and
   a plurality of carrier members pivotally secured to said actuator, each of said carrier members operatively cooperating with a pair of said slide members such that reciprocatory movement of said actuator moves said carrier members and correspondingly said slide members to move pairs of said jaws simultaneously relative to each other to engage work-piece therebetween and allows the pairs of said jaws to pivot until a pressure exerted on the work-piece by said work engaging jaws is equalized.

2. An equalizing power chuck as set forth in claim 1 wherein each of said carrier members include a pair of apertures extending therethrough, one of said slide members being disposed within one of said apertures.

3. An equalizing power chuck as set forth in claim 2 wherein said slide member has an inclined surface.

4. An equalizing power chuck as set forth in claim 3 wherein each of said apertures is inclined such that it receives and cooperates with said inclined surface of said slide member.

5. An equalizing power chuck as set forth in claim 1 wherein each of said carrier members has a centering pin and said body has a cavity opposing said centering pin.

6. An equalizing power chuck as set forth in claim 5 including a bushing disposed in said cavity and having an aperture extending therethrough.

7. An equalizing power chuck as set forth in claim 5 wherein said centering pin has a cone portion extending axially and opposed rib portions extending radially.

8. An equalizing power chuck as set forth in claim 1 including an aperture extending axially through each of said carrier members.

9. An equalizing power chuck as set forth in claim 8 including a fastener extending through said aperture to pivotally secure said carrier member to said actuator.

10. An equalizing power chuck as set forth in claim 9 including a bushing disposed in said aperture and about said fastener.

11. An equalizing power chuck as set forth in claim 1 wherein each of said carrier members is generally rectangular in shape.

12. An equalizing power chuck comprising:
a body;
a plurality of work engaging jaws;
a plurality of rocker arms carrying said jaws, said rocker arms extending axially along an axis, said rocker arms having a mounting portion at one axial end for said jaws and an end portion at the other axial end;
a plurality of swivel mountings connecting said rocker arms to said body;
a plurality of slide members receiving said end portions of said rocker arms;
a reciprocal actuator disposed centrally of said rocker arms;
a plurality of carrier members pivotally secured to said actuator, wherein each of said carrier members include a pair of apertures extending therethrough, one of said slide members being disposed within one of said apertures such that reciprocatory movement of said actuator moves said carrier members and correspondingly said slide members to move pairs of said jaws simultaneously relative to each other to engage a work-piece therebetween and allows the pairs of said jaws to pivot until a pressure exerted on the work-piece by said work engaging jaws is equalized.

13. An equalizing power chuck as set forth in claim 12 wherein said slide member has an inclined surface and each of said apertures is inclined such that it receives and cooperates with said inclined surface of said slide member.

14. An equalizing power chuck as set forth in claim 12 wherein each of said carrier members has a centering pin and said body has a cavity opposing said centering pin.

15. An equalizing power chuck as set forth in claim 14 including a bushing disposed in said cavity and having an aperture extending therethrough.

16. An equalizing power chuck as set forth in claim 15 wherein said centering pin has a cone portion extending axially and opposed rib portions extending radially.

17. An equalizing power chuck as set forth in claim 12 including an aperture extending axially through each of said carrier members.

18. An equalizing power chuck as set forth in claim 17 including a fastener extending through said aperture to pivotally secure said carrier member to said actuator.

19. An equalizing power chuck as set forth in claim 18 including a bushing disposed in said aperture and about said fastener.

20. An equalizing power chuck as set forth in claim 12 wherein each of said carrier members is generally rectangular in shape.

* * * * *